United States Patent Office 3,200,392
Patented Aug. 10, 1965

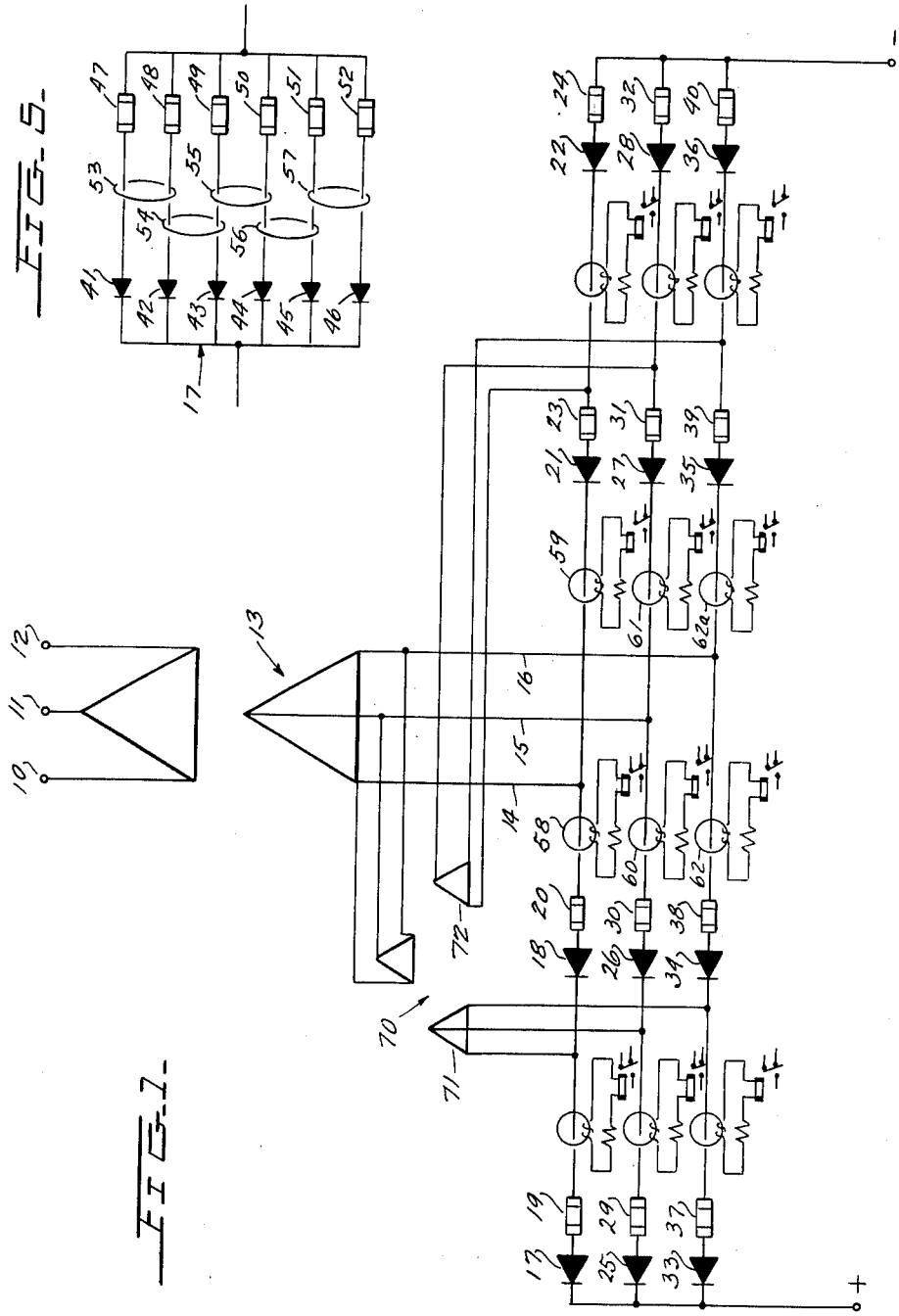

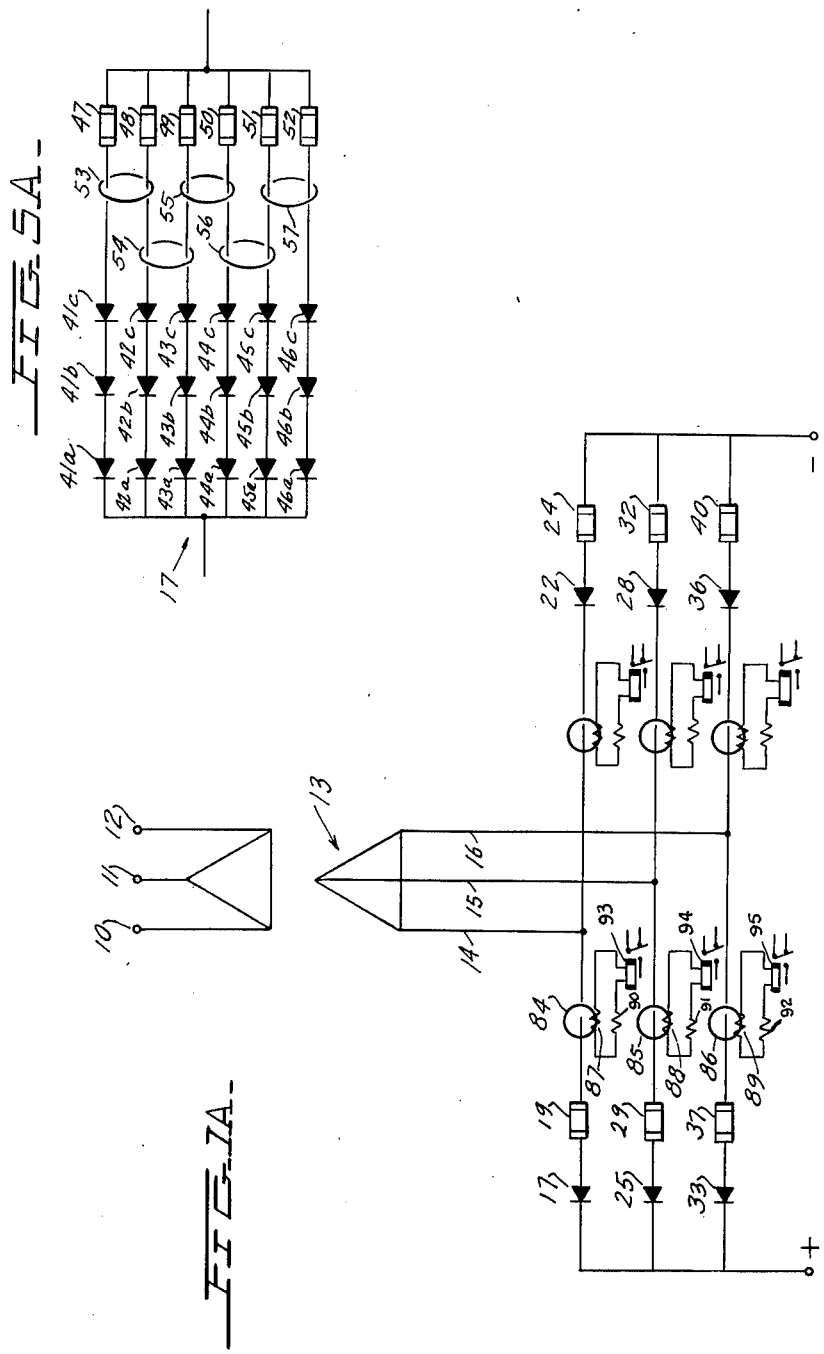

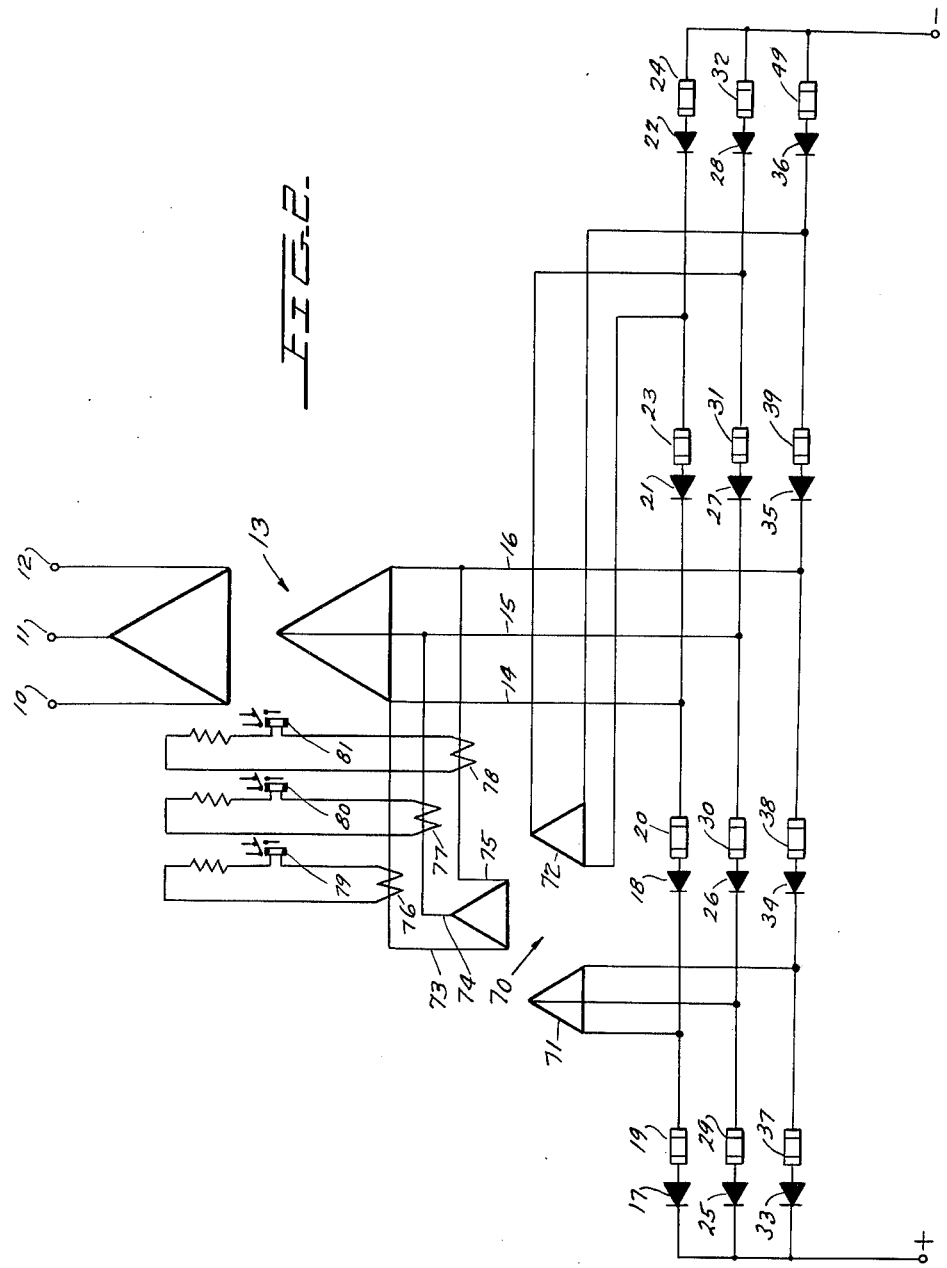

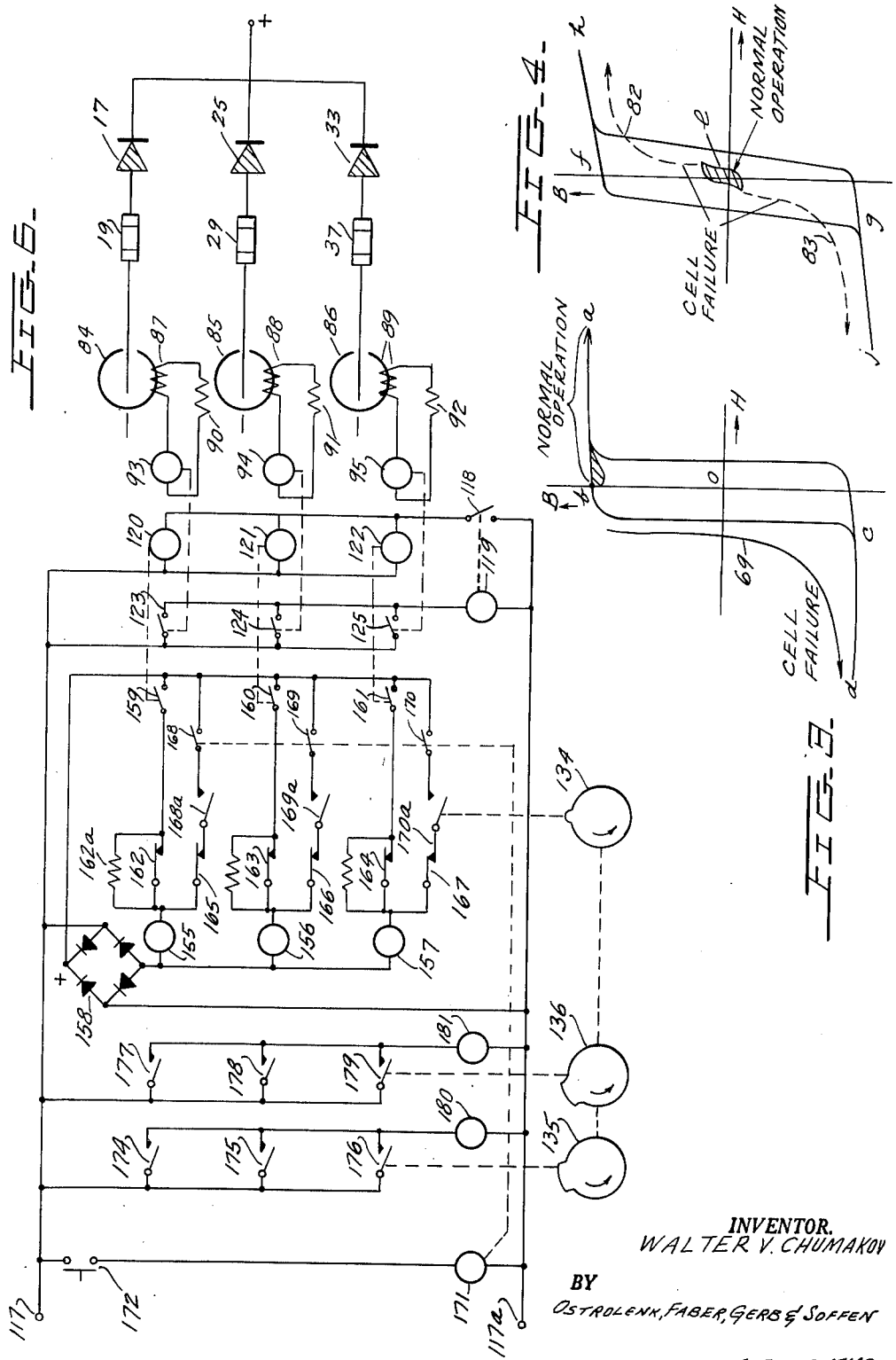

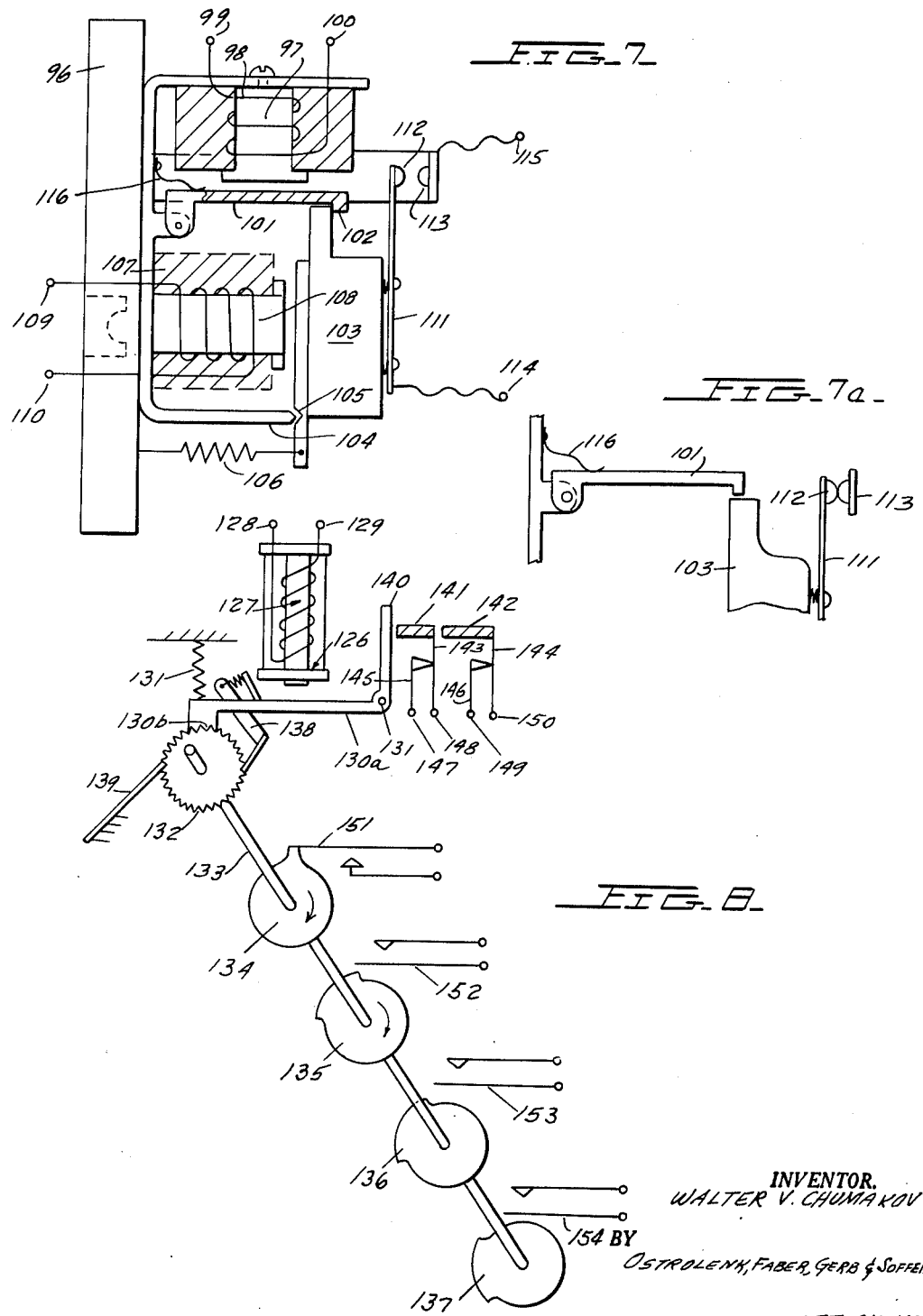

3,200,392
COUNTING CIRCUIT FOR COUNTING CELL
FAILURES IN A RECTIFIER SYSTEM
Walter V. Chumakov, Philadelphia, Pa., assignor to I-T-E
Circuit Breaker Company, Philadelphia, Pa., a corporation of Pennsylvania
Filed Dec. 2, 1960, Ser. No. 73,451
3 Claims. (Cl. 340—253)

This invention relates to a counting circuit for counting the number of cell failures in a high power conversion system comprised of a plurality of either or both parallel connected and series connected rectifier cells.

In a high power rectifier system comprised of a plurality of individual rectifier cells, it is desirable to know precisely how many cells in the system have failed before shutting down the unit. That is to say, there are many applications where it is not desired to shut down a complete rectifier system because only one of the cells forming the rectifier system has failed. It is quite possible that the remaining rectifier cells can adequately handle the power that must be delivered to the load. When, however, in a particular bank of cells more than a predetermined number of cells have failed, such as three or four, depending upon the requirement of the system involved, it may only then be necessary to shut down the unit and replace the faulty cells.

In accordance with the present invention, a novel counting means is combined with a pulse generating system which generates a voltage pulse each time there is a cell failure so that, for example, once a predetermined number of cells fail, the complete system will either be automatically removed from the line or an alarm means can be sounded. At the same time, a physically observable means such as lights or an annunciator can be used to indicate at any particular time how many cells have failed. The pulse generating means may be of the type set forth in copending application Serial No. 65,382, filed October 27, 1960, entitled "Pulse Generating Circuit for Rectifier Systems," in the name of Otto Jensen, and assigned to the assignee of the present invention.

The counting system may utilize a pulse type relay for each bank of cells which is operable from the pulse generating system for that bank, and a step type relay for each bank which is advanced a single step each time the pulse relay of that bank is operated. With each advancing step, new indicating means may be brought into operation so that where the relay is advanced two steps, signal means will indicate that two failures have occurred in the particular bank of cells. Once the preset number of failures is reached, the system may then be automatically shut off as where the fourth step of the step relay automatically operates the rectifier system interrupting equipment.

In the novel system, there is a definte count of the number of failures as indicated by a specific physical position of the counting structure. This is to be contrasted to prior attempts at counting where the failure of a cell caused the closing of a second circuit in parallel with the first circuit and so on, with each new failure closing a further parallel circuit. In this type of device, the increase of current in the output circuit is not linear with respect to the number of failures so that accurate counting is difficult. Furthermore, the circuit may employ fuses with indicating plungers or pins which make contact with adjacently mounted terminal members after a cell fails and the fuse operates. Hence, operation of the circuit depends on proper functioning of pins in sand filled fuses and on proper alignment of pins with respect to stationary contact members.

A more severe practical limitation on this prior type of circuit is that it requires a great number of direct electrical connections to the rectifier system per se and thus causes severe insulation problems. This number of connections corresponds to number of diodes in the unit. The circuit, therefore, depends on the rating of the power conversion system and is quite complex in units with large number of diodes.

Another prior type of circuit uses indicating means which operate upon cell failure but require continuous power from the main power conversion system in order to preserve a record of failures. Such record of number and location of failures is, therefore, wiped out if the rectifier or inverter unit is de-energized for maintenance or other reasons.

In the present novel counting circuit which uses a pulse generating means which operates responsive to a cell failure a pulse type relay and a counting relay, each of the above noted disadvantages is overcome.

Accordingly, a primary object of this invention is to provide a novel counting circuit for counting the number of failures of the cells of a rectifier or inverter system.

A further object of this invention is to provide a novel cell failure counting system for rectifiers or inverters comprised of a plurality of electrically interconnected cells which substantially decreases the number of electrical connections to be taken to the live parts of the power conversion system.

Another object of this invention is to provide a counting circuit for counting the number of rectifier cell failures which delivers a positive and direct indication of the count.

Still another object of this invention is to provide a novel cell failure counting system which preserves a record of failures even after the power conversion system has been de-energized.

Yet another object of this invention is to provide a novel counting circuit which does not increase in complexity with increase in number of cells in a power conversion system, so that the same circuit can be used for any number of parallel and series connected cells.

These and other objects of our invention will become apparent from the following description taken in conjunction with the drawings in which:

FIGURE 1 is a circuit diagram of a three phase, bridge connected rectifier system where a pulse type generating means for each of a bank of rectifiers is connected to a conductor in series with the rectifiers.

FIGURE 1A is similar to FIGURE 1 except that power to blow the fuses is furnishes by the main rectifier transformer.

FIGURE 2 is similar to FIGURE 1 but illustrates the manner in which the pulse generating means is connected in a voltage balancing transformer circuit.

FIGURE 3 is a flux-current characteristic of the magnetic core and conductor therethrough for the pulse generating circuit of FIGURE 1.

FIGURE 4 is a flux-current characteristic for the current transformer of FIGURE 2.

FIGURE 5 schematically illustrates one method of construction of each of the banks of rectifier cells and fuses of FIGURES 1 and 2 and shows the manner in which they are formed of pluralities of parallel connected cells and respective fuses.

FIGURE 5A shows another method of construction of each of the banks of rectifier cells of FIGURES 1, 1A and 2 with one fuse protecting respective strings of series connected cells.

FIGURE 6 schematically illustrates the manner in which one of the banks of cells of FIGURE 1 is adapted with a pulse type relay and counting relay systems in accordance with the invention.

FIGURE 7 is a side cross-sectional view of a pulse type relay which can be used in FIGURE 6.

FIGURE 7A illustrates the contact closed position for the pulse relay of FIGURE 7.

FIGURE 8 is a partially perspective view of a counting relay which can be used in the present invention.

Referring now to FIGURE 1, I have shown a typical three phase, bridge connected rectifier circuit wherein a main source of A.-C. power connected at terminals 10, 11 and 12 is connected to the primary windings of a rectifier transformer 13. The rectifier transformer 13 may then have a plurality of secondary windings each of which drives a respective rectifier circuit. In FIGURE 1 I have shown at least one of these secondary windings which has output conductors 14, 15 and 16 for each phase respectively. Conductor 14 is then connected to the center point of two arms of a rectifier bridge each of which includes appropriately connected banks of rectifier cells for achieving the voltage and current requirements of the rectifier circuit.

By way of example, the positive side of one phase of the rectifier system includes rectifier cell groups or banks 17 and 18, shown for convenience as a single cell, which are connected in series with respective protective fuses for each cell of the bank schematically shown by fuses 19 and 20 respectively. In a like manner, the negative portion of the same phase of the rectifier circuit includes cell groups 21 and 22 which have protective fuses 23 and 24 associated therewith where each cell of the bank or each string of series connected cells has a respective fuse.

Conductor 15 drives the arms of the bridge which include cell groups 25, 26, 27 and 28 which have schematically illustrated protective fuses 29, 30, 31 and 32 respectively associated with each of the individual cells or cell strings, while conductor 16 is associated with cell groups 33, 34, 35 and 36, which have fuses 37, 38, 39 and 40 respectively associated therewith.

Each of the cell groups designated above may be composed, for example, of a plurality of parallel connected fuses, as illustrated in FIGURE 5. More specifically, in FIGURE 5, the cell groups such as cell group 17 are shown as being comprised of individual cells 41 through 46 which may be of silicon, germanium or selenium, or any other desired rectifying medium, and may be of diode, controlled rectifier, transistor or other type. The fuse means 19 illustrated for cell group 17 is more specifically comprised, as shown in FIGURE 5, of individual fuse means 47 through 52 for cells 41 through 46 respectively.

If desired, current balancing means, which could be comprised of couplet reactors, as shown in copending application Serial No. 628,324, field December 14, 1956, in the name of Isadore K. Dortort, entitled "Current Balancing Reactors for Semi-Conductor Diodes," and assigned to the assignee of the instant invention, now issued as U.S. Patent 2,994,028 on July 25, 1961, can be provided, such as couplet reactors 53 through 57 which cause current balancing to occur between parallel connected cells 41 through 46. Another example of cell group construction is illustrated in FIGURE 5A wherein components similar to those of FIGURE 5 have been given similar identification numerals. The group consists of a number of parallel connected strings, each comprised of a number of series connected cells, such as 41a, 41b, 41c and a respective fuse such as fuse 47. All cells in a given string should fail before the associated fuse operates disconnecting the faulty string.

Returning now to FIGURE 1, I have further provided a voltage balancing scheme of the type shown in U.S. Patent No. 2,932,781, issued April 12, 1960, entitled "Semi-Conductor Protective Means," to Otto Jensen, which is assigned to the assignee of the present invention. The voltage balancing scheme includes a transformer 70 which has one primary winding and two secondary windings. The first secondary winding 71 is connected between the junction of adjacent cell groups in the positive side of the rectifier, while the second secondary winding 72 is connected between adjacent rectifier groups in the negative side of the rectifier. Where more than two series connected groups are utilized, additional secondary windings will be provided, as is fully described in the above noted U.S. Patent 2,932,781.

As further described in the above noted U.S. Patent 2,932,781, the voltage balancing circuit will function so that, responsive to a failure of any of the cells or cell strings of a given group, a high current will be passed through the faulty cell or cell string to cause operation of its respective fuse.

In the illustration of FIGURE 1, and assuming the cell groups or banks are composed as shown in FIGURE 5, it will be apparent that there will be 72 individual cells for the rectifier unit associated with the single secondary winding of transformer 13. In some presently manufactured rectifier units, there have been as many as 20 cells for each cell group shown, so that for the system of FIGURE 1 there would be 240 individual cells. If four secondary windings were provided for transformer 13, the resulting rectifier system would have 960 individual cells.

In designing the rectifier banks, it is the practice to underrate the cell groups so that failure of one or two cells will not disable a group, and it can continue to function until some convenient maintenance period when the cells can be replaced. It is, however, necessary for maintenance personnel to know when more than a safe number of cells have failed so that immediate action can be taken before the normal maintenance period to avoid serious damage to remaining operative cells when enough cells in one group have failed to cause subsequent failure of the whole group.

Accordingly, pulse generating means are provided for generating an electrical impulse responsive to the failure of any of the individual cells or cell strings where voltage balancing transformers are not provided. This pulse generating means is comprised of a single circuit means which is operable with a plurality of the cells. This is to be contrasted to the prior are attempts at fault indication where each of the individual cells is necessarily provided with its own respective fault indicating means.

A first embodiment of the pulse generating means is set forth in FIGURE 1, taken, for example, in conjunction with FIGURE 5, where a saturable reactor core is connected in each arm of the bridge for each group of cells. Thus, saturable reactor cores 58, 59, 60, 61, 62 and 62a are provided for each of the bridge arms including group 18, 21, 26, 27, 34 and 35 in FIGURE 1. In a similar manner, identical types of cores are provided for the remaining cell groups, and operate in the same manner for the arms including cell groups 17, 22, 25, 28, 33 and 36, as do the cores 58 through 62a operate for their respective groups, as will be more fully described.

These cores may be formed of a small winding of magnetic material preferably with square hysteresis loop characteristic to form a magnetic core having a small cross-sectional area. The main conductor for the respective rectifier cell bank can pass straight through the core to serve as a single turn winding. Thus, the cores are relatively inexpensive, and can be supported directly from the bus structure. Each of the cores 58 through 62a are then provided with output windings which are connected in series with a current limiting resistor and some type of indicating means such as indicating means 63, 64, 65, 66, 67 and 68 for cores 58 through 62a respectively.

As will be seen more fully hereinafter, these indicating means 63 through 68 may be formed of relays operable responsive to the generation of a pulse to cause the further operation of a step-type relay for counting purposes. In the operation of the pulse generating circuit of FIGURE 1, under normal current conditions in any of the arms, the magnetic cores will be saturated in a forward direction, as shown in FIGURE 3. That is to say, during normal operation, the ampere turns driving flux through any of cores 58 through 62a will move through an excursion from a to b and back to a. During this excursion, the only flux change caused in the core is that small shaded area shown in FIGURE 3 which is insufficient to generate a voltage substantial enough to cause operation of the devices 63 through 68.

When, however, any of the cells of the groups associated with a particular core fail, there will be a high reverse current furnished by the voltage balancing transformer 70 through the cell which fails. This reverse current, illustrated by arrow in FIGURE 3, causes a complete flux excursion of the core associated with the cell group so that a substantial voltage pulse is generated to cause operation of the indicating device associated therewith. When this reverse current reaches a high enough value, the fuse associated with the cell which failed operates to remove it from the group, the core flux is reset during the next conducting period, and the circuit then continues in normal operation.

If now a second cell were to fail in the same group or bank, the same operation would proceed where the same indicator device would again be reoperated. It is to be noted that in accordance with the invention, a single indicator device is operable for any of the cells of its respective group.

It should be noted that although in the example of FIGURE 1 the disclosed counting circuit was adapted to a rectifier unit with voltage balancing transformer means, such means are not necessarily required for operation of the circuit. I have shown, for instance, a 3-phase rectifier unit bridge in FIGURE 1A which contains some components similar to these of FIGURE 1 with similar identification numerals. Cell groups 17, 22, 25, 28, 33 and 36 may be constructed as shown in FIGURE 5 or 5A with saturable reactor cores, such as 84, 85, 86, associated respectively with each cell group. If a cell, such as cell 41 of FIGURE 5, or a cell string, such as one comprised of cells 41a, 41b, 41c of FIGURE 5A, fail, the power to blow its respective fuse 47 will be furnished directly by the main transformer 13 resulting in flux reversal of respective core 84 and a signal to the counting circuit. Hence, depending on arrangement of cells, the circuit will either count number of cell failures in each group such as shown in FIGURE 5 or number of cell string failures in each group illustrated in FIGURE 5A.

In a second embodiment of the flux generating circuit, the circuit may be applied in the transformer circuit of a voltage balancing scheme of the type shown in the above noted U.S. Patent No. 2,932,781. This scheme is set forth in FIGURE 2 wherein components similar to those of FIGURE 1 have been given similar identification numerals.

As further described in the above noted U.S. Patent 2,932,781, the primary circuit of transformer 70 will see a high current responsive to failure of a cell.

To take advantage of this increase in primary circuit current, each of the conductors 73, 74 and 75 leading to the primary winding of voltage balancing transformer 70 have current transformers 76, 77 and 78 connected thereto. These current transformers may be constructed of a silicon steel magnetic core, and their secondary windings are connected to indicator devices 79, 80 and 81 respectively in series with respective current limiting resistors.

Indicating devices 79 through 81 may be similar to the indicating devices such as devices 63 through 68 of FIGURE 1, and are operable responsive to the generation of a pulse on the secondary winding of current transformers 76 through 78.

During operation of the circuit of FIGURE 2, so long as current flow through the cells is normal, the cores of current transformers 76 through 78 will execute a flux change, as indicated in the shaded area of FIGURE 4 where the only ampere turn generation is the ampere turns caused by the leakage current of the cells and the magnetizing current of the voltage balancing transformer.

When, however, there is a cell failure in, for example, cell group 17, a pulse current will be passed through the cell group to operate the fuse associated with the faulty cell. This current will be reflected in the primary winding by the current illustrated by dotted arrow 82 of FIG. 4 to cause the generation of the pulse in current transformer 76. If the faulty cell had appeared in cell group 18, then it is clear that the pulse current in conductor 73 would follow dotted arrow 83 in FIGURE 4 to cause a flux excursion of one-half the total flux change of the core, as was the case for current excursion 82, so that again a pulse is generated on winding 76 to cause operation of indicating device 79.

It will be noted that in case of a cell failure, e.g. in cell group 17, the return path for the primary pulse current is through current transformer 77, when cell group 25 conducts in normal fashion, and through current transformer 78, when cell group 33 is in forward conduction state. The duration of the pulse current depends on interrupting time of cell fuses.

FIGURE 2 illustrates one way of connecting current transformers, namely in primary line conductors 73, 74 and 75. It is obvious, however, that the current transformers could be arranged in series with each primary winding or each secondary winding of the voltage balancing transformer (inside of the delta) or connected to secondary line conductors of said transformer.

It will be shown in the following, how the circuit of FIGURE 2 could be used to count total number of cell failures in the rectifier system. The circuit, however, could also be modified to count and indicate number of cell failures in each half or each phase of the rectifier unit.

The indicating means of FIGURES 1 and 2 which is energized each time there is a cell failure, may be now used to initiate the operation of a counting circuit, whereby the actual number of cell failures may be directly counted.

In a circuit of the type shown in FIGURE 1, for example, and since one indicating means is provided for each group of cells, it will be possible to count the actual number of failures occurring in that group.

In the embodiment of FIGURE 2, the counting circuit may be used to count the total number of failures in the power conversion system. This counting is further accomplished in the absence of a plurality of electrical conductors taken directly to the rectifier circuit, as has been required of prior counting circuits, so that this hazard of a plurality of small conductors coming from live portions of the rectifier is eliminated. At the same time, the circuitry may be substantially simplified, and may be made more reliable.

A typical counting system is illustrated in FIGURE 6, for the case of cell groups 17, 25 and 33 of FIGURE 1 or 1A, it being understood that similar counting circuits would be provided for the remaining cell groups. Each of the groups 17, 25 and 33 is provided with saturable magnetic cores 84, 85 and 86, as disclosed for the other cell groups of FIGURE 1, where the cores 84 through 86 are provided with output windings 87, 88 and 89 respectively which are connected in series with current limiting resistors 90, 91 and 92 and indicating devices 93, 94 and 95 respectively which, for use in a counting circuit, are preferably relays which are operable responsive to the generation of an electrical pulse on windings 87 through 89.

The pulse operated relays 93 through 95 may be of the type shown in FIGURES 7 and 7A, and can, for example, be a pulse relay such as the latch type relay identified as FR.51 Midget Latch manufactured by the Struthers Dunn Corporation. Generally, the relay structure can include, as shown in FIGURES 7 and 7A, a mounting panel 96 which supports a stationary solenoid magnetic structure 97 which has a solenoid coil 98 associated therewith, and is energized from terminals 99 and 100.

The solenoid structure 97 is positioned adjacent a pivotally mounted solenoid armature 101 which has a latch-type end 102 which is engageable with an extension of armature 103. The armature 103 is pivotally carried by member 104 which enters notched portion 105 of armature 103, and notch 105 is retained against member 104 by biasing spring 106 which also serves as a contact-closing spring, as will be described.

Armature 103 cooperates with an operating solenoid mechanism 107 which has a solenoid winding 108 which is energized from terminals 109 and 110 where this mechanism serves as a re-set mechanism for the relay. Armature 103 then carries the relay contact arm 111 which is terminated by contact 112 which is movable between an engaged and disengaged position with respect to stationary contact 113. Thus, the relay serves to connect and disconnect the output terminals 114 and 115 connected to arm 111 and stationary contact 113 respectively.

In the operation of the relay of FIGURE 7, terminals 99 and 100 are connected in series circuit including the output winding of the saturable reactor and the current limiting resistor. By way of example, in FIGURE 6 for magnetic core 84, the relay 93 will have terminals such as terminals 99 and 100 of FIGURE 7 connected in series with coil 87 and resistor 90. In a like manner, all of the remaining saturable reactor cores such as cores 85 and 86 of FIGURE 6, as well as cores 58 through 62a of FIGURE 1, have a pulse-type relay of the type described in FIGURE 7 connected as described above.

When an output pulse appears on the output winding of the particular saturable-type core, a voltage pulse is applied to terminals 99 and 100 of the relay of FIGURE 7 so that armature 101 is moved upwardly against the force of biasing leaf-spring 116. This removes latch portion 102 from the extension of armature 103 so that armature 103 is moved in a clockwise direction under the influence of biasing spring 106 to move contact 112 into engagement with contact 113, as shown in FIGURE 7A. This causes a connection between terminals 114 and 115 to cause energization of the circuit to be described hereinafter.

The subsequent energization at terminals 109 and 110 causes energization of the solenoid structure 107 so that armature 103 is moved back to the position of FIGURE 7 to disengage contacts 112 and 113, and de-energize the circuit connected to terminals 114 and 115.

If desired, the terminals 109 and 110 can be automatically energized through auxiliary circuit means which could include an auxiliary set of contacts operable by armature 103 and a time delay means so that terminals 109 and 110 are automatically energized at a predetermined time after the engagement of contacts 112 and 113.

It is now possible to cause a counting circuit to be driven through an electrical circuit which includes terminals 114 and 115 of the pulse type relay of FIGURE 7. This counting circuit is schematically shown in FIGURE 6 as including an auxiliary source of A.-C. voltage which is connected to terminals 117 and 117a. The circuit is then formed of a plurality of parallel connected branches wherein the first branch is taken through a pair of relay contacts 118 associated with relay coil 119 at the bottom of FIGURE 6, and connected to the lead extending from terminal 117a. The relay, including relay contacts 118 and coil 119, is a time delay relay with the contacts 118 being connected in series with the parallel connected reset coils 120, 121 and 122 of pulse type relays 93, 94 and 95 respectively. Relay coils 120, 121 and 122 correspond to the aforementioned reset coil 108 of the pulse type relay of FIGURE 7.

The relay coil 119 of the time delay relay is connected in series with parallel connected relay contacts 123, 124 and 125 of the pulse type relays 93, 94 and 95 respectively where these contacts correspond to contacts 112 and 113 of the pulse type relay of FIGURE 7.

The next portion of the counting circuit includes a step-type of relay of the type shown in FIGURE 8. This step-type relay can be of the type of stepping relay of the series OCS manufactured by the Automatic Electric Company. The relay, as shown in FIGURE 8, is comprised of an operating magnet 126, which has an energizing coil 127 having terminals 128 and 129. The magnet 126 cooperates with a pivotally mounted armature 130 pivoted at pivot point 130a.

The left-hand end of armature 130 has a driving spring 131 bearing thereagainst to drive stopping teeth 130b (lower toothed portion) of armature 130 into engagement with a ratchet-wheel 132. The ratchet-wheel 132 is mounted on a shaft 133 which has a plurality of cams 134, 135, 136 and 137 thereon, the number of cams depending upon the required number of functions or circuits to be operated by the relay. The shape of the cams, of course, depends on required programming or number of step positions for the relay. A driving pawl 138 is carried by armature 130 to drive ratchet 132 in a clockwise direction, while a holding pawl 139 is positioned to maintain ratchet 132 in a position left by pawl 138.

The armature 130 has a further upwardly extending member 140 which is engageable with insulated extensions 141 and 142 of resilient conductors 143 and 144. Resilient conductors 143 and 144 are normally engaged with the contacts carried by resilient arms 145 and 146 so that terminal 147 is normally connected to terminal 148 and terminal 149 is normally connected to terminal 150.

Once coil 127 is energized at terminals 128 and 129, armature 130 is moved in a clockwise direction against the force of driving spring 131. This causes pawl 138 to move upward into engagement with the next tooth of ratchet 132, disengages stopping teeth 130b from the ratchet and actuates contacts 143–145 and 144–146. Holding pawl 139 holds the cam assembly in position between steps of the relay. When the magnet coil 127 is deenergized, the drive spring 131 expands and restores the pawl 138 and armature 130 to normal position advancing ratchet 132 one step ahead in clockwise direction. At the end of the driving stroke, stopping teeth 130b mesh with the ratchet teeth locking the assembly in place and contacts 143–145 and 144–146 are restored to normal position. This rotation will, of course, move cams 134 and 137 so that, for example, a homing contact to be described more fully later including flexible arm 151 is closed, while a first flexible contact 152 is also closed.

One the next energization of coil 126, there will be a further rotation of shaft 133 which will cause engagement of the next flexible contact 153 by cam 136 and further rotation will cause engagement of the still further contact 154 by cam plate 137. Thus, the number of times that the coil is energized will be reflected in the particular contact 152, 153 or 154 which is moved to its closed position by its operating cam.

The manner in which such a stepping relay is respectively provided for each of the pulse relays 93, 94 and 95 of FIGURE 6 is shown in FIGURE 6 where the stepping relay coils 155, 156 and 157 are connected in parallel with one another and in series with a source of D.-C. voltage 158 which is energized from terminals 117 and 117a. The series connection for each of coils 155, 156 and 157 further includes an auxiliary contact 159, 160 and 161 respectively which can be auxiliary contacts similar to contacts 113 and 112 of the pulse relay of FIGURE 7, and operable by coils 120–93, 121–94 and 122–95 respectively. The aforementioned series circuit further includes contacts 162, 163 and 164 which correspond to contact elements 143 and 145 of the stepping relay of FIGURE 8.

A branch circuit is then provided from coil 155, 156 and 157 to the other side of their respective contacts 159, 160 and 161 respectively which includes contacts 165, 166 and 167 which correspond to the contact elements 144 and 146 of FIGURE 8.

The branch circuit further includes contacts 168, 169, 170 and 168a, 169a and 170a respectively for the three circuits shown. Contacts 168, 169 and 170 are operable from a reset relay 171. Reset relay coil 171 is connected directly across terminals 117 and 117a in series with a manually operable reset button 172. Stepping relay contacts 168a, 169a and 170a which are similar to contact 151 of FIGURE 8 are operable by the homing cam 134, as shown in FIGURE 8, and as schematically illustrated in FIGURE 6.

The final parallel circuits associated with the counting circuit include a series of parallel circuits which include, for example, contacts 174, 175 and 176 which are the contacts of the stepping relay corresponding to contact 152 which is operable by cams 135 of the associated stepping switch as schematically illustrated in FIGURE 6.

A second series of contacts includes contacts 177, 178 and 179 which correspond to the second stepping stage which includes contact member 153 of FIGURE 8 for each of the stepping relays of FIGURE 6 which is operable, as schematically illustrated by cam 136 in FIGURE 6.

Clearly, further stages will be provided in FIGURE 6 depending upon the number of cam positions used in the stepping relays, or upon functions assigned to the circuit.

The operation of the circuit of FIGURE 6 is as follows:

It is first assumed that one of the cells of the cell group 17 fails. This causes the generation of an output voltage on winding 87 to energize pulse relay coil 93 which closes contacts 123 and 159. The closing of contact 159 causes the energization of coil 155 which causes the stepping relay armature associated with coil 155 to operate in previously described manner and to open contacts 162 and 165. Contact 162 connects a by-pass resistor 162a in series with the coil 155 reducing coil current to a hold-in value sufficient to keep its armature attracted to the magnet, while contact 165 disocnnects reset branch 168a–168 until contact 159 is opened again.

Simultaneous with the closing of contact 159, contacts 123 are closed to energize the time delay relay coil 119. Thus, after a predetermined time, preferably after reverse current decays to zero and flux of the pulse core is reset, relay contacts 118 are closed to energize reset coil 120 of the pulse relay which returns the relay to a non-energized or latched-in position, as shown in FIGURE 7. Thus, pulse relay contacts 123 and 159 open and de-energize relays 119 and 155 respectively. When stepping relay coil 155 is de-energized, its cams are advanced at least one step during restoration of the armature as noted above so that contact 174 is closed to operate an annunciator circuit or other type of indicating means indicating a single failure. At the same time, the homing cam 134 closes contacts 168a allowing reset-to-zero operation of the stepping relay at some later time. The counting circuit is now prepared for the next counting operation. Contacts 162 and 165 remain in closed position until coil 155 is energized again. This same operation will occur for failure of a cell of any of the other groups, such as groups 25 or 33. That is to say, if there is a failure of a first cell of group 25, contact 175 will close to energize appropriate indicating means, while failure of the first cell of group 33 will cause contact 176 to close.

If now there is a second failure of a cell in group 17, the same operation described above will proceed where the further energization of the stepping relay will cause cam 136 to close contact 177 and, as example, may open contact 174. The closing of contact 177 will then be used to indicate that two of the cells of group 17 have failed, as in an annunciator device or similar indicating means.

Accordingly, the novel counting circuit physically presents information as to how many cells of any of the cell groups have failed in the absence of wiring taken directly to the rectifier circuitry, and in a highly reliable manner.

When it is desired to reset the stepping relay back to a zero position, it is only necessary to momentarily close reset button 172 to energize reset relay coil 171. This causes contacts 168, 169 and 170, which are associated with relay coil 171, to close so that a circuit is completed through stepping relay coils 155, 156 and 157 which continues to drive the stepping relays around until their home position cam, such as cam 134 for the relay including coil 155, reaches a home or zero position, and opens contacts 168a, 169a and 170a to stop the stepping operation in the zero position. Although one common reset button 172 is illustrated for a group of stepping relays, each relay could be provided with individual buttons substituted for contacts 168, 169, 170 of the relay 171 or the stepping relays could be reset manually.

As mentioned above, the operation of the stepping relay contacts such as contacts 174, 175 and 176 of the first stage can cause the operation of appropriate individual or common indicating means. By way of example of common indicating and control means, in FIGURE 6 I have shown a relay coil 180 which can have contacts (not shown) for energizing an alarm circuit, a lamp indicating means or an annunciator station corresponding to one cell failure in cell groups 17, 25 and 33. On the failure of a second of any of the cells, a second relay coil 181 will be energized to again energize an alarm circuit and lamp indicating means and a second annunciator station so that a "count two" visual indicating means is energized. Depending upon the particular rectifier design, if two cell failures in any one group require that the rectifier be immediately shut down and the faulty cells replaced, the relay coil 181 may be further used to cause automatic interruption of the A.-C. circuit breaker of the rectifier unit. Furthermore, instead of relays 180 or 181, an auxiliary contact of timing relay 119 (not shown) could be used to energize the alarm circuit, if so desired.

If desired, operating contacts of pulse relays could be connected in groups according to requirements whereby each group of relays will operate one counting circuit. By way of example, contacts of pulse relays 63, 65, 67, 93, 94 and 95 of FIGURE 1 could be connected in parallel and substituted for contact 159 of FIGURE 6. In this case stepping relay 155 will count number of cell failures in the positive half of the rectifier bridge of FIGURE 1.

It will be noted that the alarm means can include markings directly made and visually observable on the stepping relay, and can include indicating lamps for each count or any other type of indicating means well known to the art.

The stepping relay set forth in connection with the embodiment of FIGURE 6 is, of course, only one type of stepping switch or position indicating means that could be used in accordance with the present invention. By way of example, the stepping switch of FIGURE 8 which is shown for each of cell groups 17, 25 and 33 in FIGURE 6 could be replaced by a stepping switch of the type having a rotary solenoid, as is manufactured by G. H. Leland, and identified by them as a Ledex rotary solenoid. This is the type of switch wherein the switch position is advanced one step each time a solenoid associated with the switch is energized.

In a like manner, the circuit can use any standard control relay and memory device arrangement to serve the function of a solenoid operated stepping switch or rotary solenoid type of device.

Although this invention has been described with respect to its preferred embodiments it should be understood that many variations and modifications will now be obvious to those skilled in the art, and it is preferred, therefore, that the scope of this invention be limited not by the specific disclosure herein but only by the appended claims.

What is claimed is:

1. In a system having a plurality of interconnected rectifier elements for exchanging energy between an A.-C. system and a D.-C. system; a counting circuit for counting the number of rectifier elements that fail; said counting circuit comprising first means for generating a voltage pulse responsive to failure of any of said rectifier elements, a pulse type relay, and a stepping relay and an indicating means; said first means being operatively connected to operate said pulse type relay responsive to the generation of a voltage pulse; said pulse type relay being operatively connected to said stepping relay to advance said stepping relay one position for each operation of said pulse type relay; said stepping relay being operatively connected to said indicating means to present a count of the number of pulses generated by said voltage generating means.

2. A counting circuit for counting the number of rectifier element failures in a system for exchanging energy between an A.-C. source and a D.-C. load; said counting circuit including means for generating a voltage pulse responsive to failure of any of at least a group of said rectifier elements and means movable a predetermined distance responsive to a pulse; said voltage pulse generating means being electrically connected to said movable means whereby each successive failure of one of said rectifier elements generates a voltage pulse to successively move said movable means through said predetermined distance; the position of said movable means indicating the number of cell failures; each of said rectifier elements being operatively connected in series with a respective fuse; each of said fuses being operable responsive to failure of their said respective rectifier elements; said means for generating a voltage pulse responsive to failure of any of said rectifier elements being operable to generate its said voltage pulse prior to operation of the said respective fuse of the rectifier cell which fails; and reset means connected to said voltage pulse generating means; said reset means being operable after each pulse generated by said voltage pulse generating means to return said voltage pulse generating means to a voltage pulse generating condition.

3. A counting circuit for counting rectifier element failures in a rectifier system; said counting circuit comprising first means for generating a voltage pulse responsive to failure of any of said rectifiers, a pulse type relay, and a stepping relay and an indicating means; said first means being operatively connected to operate said pulse type relay responsive to the generation of a voltage pulse; said pulse type relay being operatively connected to said stepping relay to advance said stepping relay one position for each operation of said pulse type relay; said stepping relay being operatively connected to said indicating means to present a count of the number of pulses generated by said voltage pulse generating means; each of said rectifier elements being operatively connected in series with a respective fuse; each of said fuses being operable responsive to failure of their said respective rectifier elements; said means for generating a voltage pulse responsive to failure of any of said rectifier elements being operable to generate its said voltage pulse prior to operation of the said respective fuse of the rectifier cell which fails; and reset means for said pulse relay; said reset means being operable to operate said pulse relay to a pulse generation condition after the generation of a pulse by said pulse relay.

References Cited by the Examiner

UNITED STATES PATENTS

| 1,887,684 | 11/32 | Huizinga. |
| 2,200,233 | 5/40 | Whitehead  340—253 XR |
| 2,709,800 | 5/55 | Temple  340—253 |
| 2,735,915 | 2/56 | Hagen  340—267 XR |
| 2,909,709 | 10/59 | Metz et al.  317—140 XR |
| 2,930,961 | 3/60 | Lezan. |
| 2,935,676 | 5/60 | Keltz  321—11 |
| 3,045,224 | 7/62 | Colaiaco  340—250 |
| 3,067,361 | 12/62 | Jensen et al.  321—11 XR |

NEIL C. READ, *Primary Examiner.*

BENNETT G. MILLER, *Examiner.*